United States Patent
Ngo et al.

(10) Patent No.: US 11,874,636 B2
(45) Date of Patent: Jan. 16, 2024

(54) METHOD AND DEVICE FOR CONTROLLING A MACHINE

(71) Applicant: Robert Bosch GmbH, Stuttgart (DE)

(72) Inventors: Anh Vien Ngo, Tuebingen (DE); Gerhard Neumann, Karlsruhe (DE)

(73) Assignee: ROBERT BOSCH GMBH, Stuttgart (DE)

(*) Notice: Subject to any disclaimer, the term of this patent is extended or adjusted under 35 U.S.C. 154(b) by 373 days.

(21) Appl. No.: 17/305,993

(22) Filed: Jul. 19, 2021

(65) Prior Publication Data
US 2022/0179373 A1    Jun. 9, 2022

(30) Foreign Application Priority Data
Dec. 3, 2020    (DE) .......................... 102020215313.2

(51) Int. Cl.
*G05B 13/04*    (2006.01)
*G06F 17/18*    (2006.01)

(52) U.S. Cl.
CPC ........... *G05B 13/042* (2013.01); *G06F 17/18* (2013.01)

(58) Field of Classification Search
CPC .............................. G05B 13/042; G06F 17/18
See application file for complete search history.

(56) References Cited

U.S. PATENT DOCUMENTS

2018/0292830 A1* 10/2018 Kazemi ................ G05D 1/0221

OTHER PUBLICATIONS

Agrawal et al, "Learning Convex Optimization Control Policies," 2nd Annual Conference on Learning for Dynamics and Control, Proceedings of Machine Learning Research, vol. 120, 2020, (pp. 1-13—PDF pp. 5-17), Including Preface (pp. 1-4).

* cited by examiner

*Primary Examiner* — Gary Collins
(74) *Attorney, Agent, or Firm* — NORTON ROSE FULBRIGHT US LLP; Gerard A. Messina

(57) ABSTRACT

A device and computer implemented method of controlling a machine. The method includes determining a state of the machine, determining a policy comprising parameters in particular a gain, for mapping the state of the machine to an input for the machine, mapping the state to the input according to the policy, an controlling the machine according to the input. A cone program is defined by a plurality of parameters of a linear quadratic regulator for the machine. A cost function is defined depending on the plurality of parameters and the policy. A constraint is defined for the parameters and for a solution of the cone program. The determining of the policy comprises determining the solution to the cone program so that the cost function meets a criterion subject to the constraint.

14 Claims, 1 Drawing Sheet

METHOD AND DEVICE FOR CONTROLLING A MACHINE

CROSS REFERENCE

The present application claims the benefit under 35 U.S.C. § 119 of German Patent Application No. DE 102020215313.2 filed on Dec. 3, 2020, which is expressly incorporated herein by reference in its entirety.

BACKGROUND INFORMATION

Linear Quadratic Regulators and Linear Quadratic Gaussian Regulators aim at controlling a machine according to an output feedback law that is optimal in the sense of minimizing an expected value of a quadratic cost criterion. Such machines may for example be robots or at least partially autonomous driving vehicles. Such machines may operate in a variety of environments, e.g., in a plant system.

Controllers that are based on such regulators have to cope with uncertainty or perturbations and have to model and capture safety constraints. The uncertainty or perturbations are often coming from an environment of the machine that is controlled such as changing lighting or weather conditions, sensor noise, actuator noise, action delays etc.

Usually such safety constraints are not representable explicitly during training or optimization. That's why an uncertainty over safety should be represented, and a robust controller is needed.

SUMMARY

A method, in particular, a computer implemented method for controlling a machine according to an example embodiment of the present invention provides a robust control. A device for controlling the machine according to an example embodiment of the present invention provides a robust controller.

In accordance with an example embodiment of the present invention, the, in particular, computer implemented method of controlling the machine, comprises determining a state of the machine, determining a policy comprising parameters in particular a gain, for mapping the state of the machine to an input for the machine, mapping the state to the input according to the policy, controlling the machine according to the input, wherein a cone program is defined by a plurality of parameters of a linear quadratic regulator for the machine, wherein a cost function is defined depending on the plurality of parameters and the policy, wherein a constraint is defined for the parameters and for a solution of the cone program, wherein determining the policy comprises determining the solution to the cone program for that the cost function meets a criterion subject to the constraint, determining the parameters depending on the solution, determining a loss, in particular a normalized, depending on a difference between the policy and a reference for the policy or depending on a difference between the input and a reference for the input for the machine, determining a partial derivative of the loss with respect to the policy, determining a partial derivative of the policy with respect to the solution, determining a partial derivative of the solution with respect to the plurality of parameters, and determining at least a subset of the plurality of parameters depending on the partial derivatives for that the loss meets a criterion.

Preferably, determining at least the subset of the plurality of parameters for that the loss meets the criterion comprises determining the at least the subset of the plurality of parameters that minimizes the loss.

In one aspect of the present invention, the plurality of parameters comprises parameters of a state equation for the machine, at least one parameter that models a perturbation attributed to the parameters of the state equation for the machine, at least one parameter that models a variance of the perturbation, and parameters of the cost function, wherein the method comprises predetermining the parameters of the state equation, predetermining the at least one parameter that models the variance, predetermining the parameters of the cost function, and determining the at least one parameter that models the perturbation for that the cost function meets the criterion depending on the predetermined parameters.

In one aspect of the present invention, the plurality of parameters comprises parameters of a state equation for the machine, at least one parameter that models a perturbation attributed to the parameters of the state equation for the machine, at least one parameter that models a variance of the perturbation, and parameters of the cost function, wherein the method comprises predetermining the at least one parameter that models the perturbation, predetermining the at least one parameter that models the variance, predetermining the parameters of the cost function, and determining the parameters of the state equation for that the cost function meets the criterion depending on the predetermined parameters.

In accordance with an example embodiment of the present invention, the method preferably comprises determining a positive semidefinite matrix belonging to a positive semidefinite cone in a subspace of symmetric matrices that meets the constraint, wherein the matrix comprises elements that are defined depending on the parameters of the state equation for the machine and/or that are defined depending the solution, wherein the method comprises predetermining the parameters of the state equation for the machine and determining the solution for that the matrix meets the constraint for the predetermined parameters of the state equation for the machine.

In one aspect of the present invention, the matrix comprises elements that are defined depending on the at least one parameter that models the perturbation and in that the matrix comprises elements that are defined depending on the at least one parameter that models the variance, wherein the method comprises the at least one parameter that models the perturbation, predetermining the at least one parameter that models the variance, and determining the solution for that the matrix meets the constraint for the predetermined parameters of the state equation for the machine, the predetermined at least one parameter that models the perturbation, and the predetermined at least one parameter that models the variance.

The method may comprise determining at least one element of the matrix depending on a factor that is larger than Zero or equal to Zero.

Determining the solution to the cone program may comprise determining the policy depending on the solution that minimizes the cost function for the plurality of parameters of the linear quadratic regulator.

In accordance with an example embodiment of the present invention, the method may comprise reading a set of references for the policy, selecting a first reference of the set, determining a first difference between the policy and the first reference, determining a sum of the first difference and a second difference that is determined for another policy and another reference of the set of references for the policy, determining the loss depending on the sum.

The input may comprise a digital image, wherein determining the state comprises recognizing an object in at least a part of the digital image, determining a property of the object, in particular a position, a class or an attribute of the object, and determining the state depending on the property.

In accordance with an example embodiment of the present invention, the method may comprise capturing the input with a sensor, in particular a camera, a radar sensor, a LiDAR sensor, a ultrasonic sensor, a motion sensor, that monitors the machine or an environment of the machine.

The device for controlling the machine is configured to execute the steps of the example method(s).

A computer program is provided as well, that comprises computer readable instructions that, when executed on a computer, cause the computer to execute the example method (s).

Further advantageous embodiments can be derived from the following description and the figures.

DETAILED DESCRIPTION OF EXAMPLE EMBODIMENTS

Figure 1:
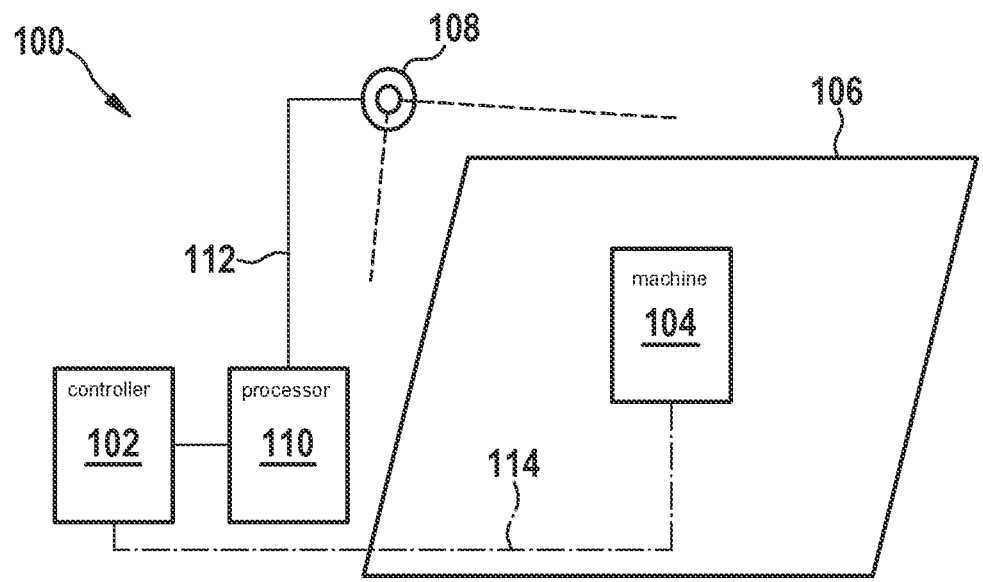
FIG. 1 depicts a part of a control system, in accordance with an example embodiment of the present invention.

FIG. 1 discloses a part of a control system 100. The control system 100 comprises a controller 102 that is adapted to control a machine 104.

The machine 104 may be a robot or at least partially autonomous driving vehicle. The machine 104 may operate in an environment 106, e.g., in a plant system.

The control system 100 may comprise a sensor 108.

The sensor 108 is adapted to capture information y about a state x of the machine 104.

The sensor 108 may be a camera, a radar sensor, a LiDAR sensor, a ultrasonic sensor, a motion sensor or a thermal imaging sensor that is adapted to capture digital images that contain the information. The sensor 108 may be a velocity sensor or an acceleration sensor or a yaw sensor or a roll sensor.

The sensor 108 may be mounted to the machine 104 to monitor the environment 106. The sensor 108 may be built into the machine 104 to monitor an internal parameter of the machine 104.

In the example depicted in FIG. 1, the camera is arranged to monitor the machine 104.

A plurality of the same type of such sensors and/or different types of such sensors may be arranged to provide the information.

The control system 100 may comprise a processor 110 that is adapted to receive the information from the sensor 108 or from a plurality of sensors and process the information to determine the state x of the machine 104.

The processor 110 may be configured to recognize an object in at least a part of a digital image that has been captured by the camera. The processor 110 may be configured to determine a property of the object, in particular a position, a class or an attribute of the object. In the example, the processor 110 is adapted to recognize the machine 104 as object and to determine the position of the machine 104 as the state x from a position of the object in the digital image. A part of the machine 104, e.g. a robot arm or thereon tool, may be controlled alike.

The controller 102 is adapted to control the machine 104 depending on the state x. The controller 102 is adapted to provide an input u to the machine 104 according to a policy m(x) that depends on the state x.

The processor 110 may be configured to provide the input u to control a movement of the machine 104 in the environment from the position represented by the state x in particular to a target position.

The sensor 108 is connected in the example to the processor 110 with a data link 112. The controller 102 is connected in the example to the machine 104 with a in particular wireless data link 114.

In one aspect, in particular for small perturbations, the controller 102 is arranged according to an infinite horizon linear-quadratic regulator, LQR, problem:

$$\pi = \arg \min_{u=\pi(x)} \sum_{t=0}^{\infty} (x_t^T Q x_t + u_t^T R u_t)$$

$$\text{s.t. } x_{t+1} = A x_t + B u_t$$

where
$\pi$ is the policy, and
$x_t \in \mathbb{R}^n$ is the state of the machine 104 at a step t, and
$u_t \in \mathbb{R}^m$ is an input provided by the controller 102 to the machine 104 at the step t, and
$A \in \mathbb{R}^{n \times n}$, $B \in \mathbb{R}^{n \times m}$ are parameters that model the machine 104, and
$Q \in \mathbb{R}^{n \times n}$, $R \in \mathbb{R}^{m \times m}$ are positive definite matrices which model the quadratic cost.

In one aspect, the controller 102 is arranged according to a robust infinite horizon linear-quadratic-Gaussian, LQG, control problem under ellipsoidal uncertainty:

$$\pi = \arg \min_{u=\pi(x)} \sum_{t=0}^{\infty} (x_t^T Q x_t + u_t^T R u_t)$$

$$\text{s.t. } x_{t+1} = A x_t + B u_t + w_t$$

$$w_t \in N(0, \sigma^2 I_n), x_0 \sim P_0$$

$$[A, b] \in \{A, B : (X^T - \mu)^T D(X^T - \mu) \leq I\}$$

where
$\pi$ is a policy, and
$x_t \in \mathbb{R}^n$ is the state of the machine 104 at a step t, and
$u_t \in \mathbb{R}^m$ is an input provided by the controller 102 to the machine 104 at the step t, and
$A \in \mathbb{R}^{n \times n}$, $B \in \mathbb{R}^{n \times m}$ are parameters that model the machine 104, and
$I_n$ is a n×n identity matrix, and
I is a (m+n)×(m+n) identity matrix, and
[A,B] is a concatenated vector of A and B, and
$P_0$ is an initial state distribution, and
$x_0$ is an initial state, and
$\mu=[\overline{A},\overline{B}]$ is a nominal model of the machine 104, and
$\overline{A}$ is a nominal parameter for the impact of the state $x_t$ at the step t, and
$\overline{B}$ is a nominal parameter for an impact of the input $u_t$ at the step t, and
D is a parameter of a model of a perturbation, and
$\sigma \in \mathbb{R}$ is a variance for the perturbation, and
$N(0, \sigma^2 I_n)$ is a Gaussian distribution, and
$w_t$ is noise of stochastic dynamics that is assumed to follow the Gaussian distribution N, and
$Q \in \mathbb{R}^{n \times n}$, $R \in \mathbb{R}^{m \times m}$ are positive definite matrices which model a quadratic cost.

In one aspect, the controller 102 is adapted to determine a gain K for the policy $u_t=\pi(x_t)=Kx_t$ that minimizes the cost $J(\theta,K)$ for a finite horizon T considering an expected value E of the quadratic cost $$J(\theta, K) = \lim_{T\to\infty} \frac{1}{T} E\left[\sum_{t=0}^{T} (x_t^T Q x_t + u_t^T R u_t)\right]$$

$$= \text{trace}\left(\begin{bmatrix} Q & 0 \\ 0 & R \end{bmatrix} \lim_{T\to\infty} \frac{1}{T} \sum_{t=1}^{T} E\left[\begin{bmatrix} x_t \\ u_t \end{bmatrix}^T \begin{bmatrix} x_t \\ u_t \end{bmatrix}\right]\right)$$

$$= \text{trace}\left(\begin{bmatrix} Q & 0 \\ 0 & R \end{bmatrix} \lim_{T\to\infty} \frac{1}{T} \sum_{t=1}^{T} E\left[\begin{bmatrix} x_t \\ Kx_t \end{bmatrix}^T \begin{bmatrix} x_t \\ Kx_t \end{bmatrix}\right]\right)$$

$$= \text{trace}\left(\begin{bmatrix} Q & 0 \\ 0 & R \end{bmatrix} \begin{bmatrix} W & WK^T \\ KW & KWK^T \end{bmatrix}\right)$$

where
$W=E[x_t x_t^T]$ is a stationary state covariance, and
$\theta=(A, B, Q, R)$ are parameters of the LQR problem.

In this aspect, the controller 102 is configured to determine W for given A and B by solving the following optimization problem:

$$\arg\min_W \text{trace}(W)$$
$$\text{s.t.} \quad W \succeq (A+BK)W(A+BK)^T$$

This is a cone program, more specifically a semidefinite program which is convex.

The controller 102 may be configured in this aspect, to determine a quadratic loss $$l = \sum_{t=1}^{T} \|u_t - u_t^*\|^2$$

where $u_t^*$ is a reference for the input that the controller 102 provides to the machine 104 in the step t.

The gain K is in this aspect determined iteratively with a gradient descent method. The controller 102 is configured in this aspect to determine a gradient $$\frac{\delta l}{\delta \theta}$$

for the gradient descent method:

$$\frac{\delta l}{\delta \theta} = \frac{\delta l}{\delta \pi} \frac{\delta \pi}{\delta W} \frac{\delta W}{\delta \theta}$$

The reference $u_t^*$ and a reference for the state $x_t^*$ for training the controller 102 may be available from demonstration data $D=\{u_t^*, x_t^*\}_{t=1}^{T}$.

The reference $u_t^*$ for training the controller 102 may be available from demonstration data $D=\{u_t^*, y_t^*\}_{t=1}^{T}$, where $y_t^*$ is a observation at the step t.

The controller 102 in this aspect is trained with the gradient descent method based on the demonstration data D to yield $$\min_{u_{1:T}} \|y_t - y_t^*\|_2$$
$$\text{s.t.} \quad x_{t+1} = Ax_t + Bu_t$$
$$y_{t+1} = Hx_{t+1}$$

where H is an observation function, e.g. describing a Kalman Filter.

The observation function H may be uncertain. In one aspect, an ellipsoidal uncertainty is modelded as $U=\{H=H_0+\sum_{i=1}^{P} c_i H_i\}$, where U is an uncertainty set and H is an affine function of P parameters $H_i$, and $H_0$ is a nominal observation function, and $\|c\|\le 1$ is a parameter.

The parameters $\theta$ in this aspect may include the observation function H:

$$\theta=(A,B,H)$$

The controller 102 is trained by determining the gradient $$\frac{\delta l}{\delta \theta}$$

and determining the gain K with the gradient descent method.

In one aspect, the controller 102 is adapted to determine the gain K and a parameter $\Sigma$ for the policy $u_t=\pi(x_t)=Kx_t+\Sigma^{1/2}e_t$, where $e_t\sim N(0,I)$ is an exploration term or understood as a Gaussian policy parametrization:

$$J(\theta, K) = \lim_{T\to\infty} \frac{1}{T} E\left[\sum_{t=0}^{T} (x_t^T Q x_t + u_t^T R u_t)\right]$$

$$= \text{trace}\left(\begin{bmatrix} Q & 0 \\ 0 & R \end{bmatrix} \lim_{T\to\infty} \frac{1}{T} \sum_{t=1}^{T} E\left[\begin{bmatrix} x_t \\ u_t \end{bmatrix}^T \begin{bmatrix} x_t \\ u_t \end{bmatrix}\right]\right)$$

$$= \text{trace}\left(\begin{bmatrix} Q & 0 \\ 0 & R \end{bmatrix} \lim_{T\to\infty} \frac{1}{T} \sum_{t=1}^{T} E\left[\begin{bmatrix} x_t \\ Kx_t + \Sigma^{1/2}e_t \end{bmatrix}^T \begin{bmatrix} x_t \\ Kx_t + \Sigma^{1/2}e_t \end{bmatrix}\right]\right)$$

$$= \text{trace}\left(\begin{bmatrix} Q & 0 \\ 0 & R \end{bmatrix} \begin{bmatrix} W & WK^T \\ KW & KWK^T + \Sigma \end{bmatrix}\right)$$

In this aspect, the controller 102 is configured to determine W for given A and B by approximating a solution for the following optimization problem:

$$\arg\min_W \text{trace}(W)$$
$$\text{s.t.} \quad W \succeq (A+BK)W(A+BK)^T + B\Sigma B^T + \sigma^2 I$$

A worst-case scenario for the uncertainty is given by $$\min_W \text{trace}\left(\begin{bmatrix} Q & 0 \\ 0 & R \end{bmatrix} \Xi\right)$$
$$\text{s.t.} \quad W \succeq ([A\ B])\Xi[A\ B]^T + \sigma^2 I$$
$$[A\ B] \in \theta$$

where $$\Xi = \begin{bmatrix} W & Z \\ Z^T & Y \end{bmatrix}$$

$$Z = WK^T$$

$$Y = KWK^T + \Sigma$$

The controller 102 is in this aspect configured to determine W with the following cone program:

$$\min_W \; \text{trace}\left(\begin{bmatrix} Q & 0 \\ 0 & R \end{bmatrix} \Xi\right)$$

$$\text{s.t.} \begin{bmatrix} I & \sigma I & 0 \\ \sigma I & W - [\overline{A}\;\overline{B}]\Xi[\overline{A}\;\overline{B}]^T & [\overline{A}\;\overline{B}]\Xi^T \\ 0 & \Xi[\overline{A}\;\overline{B}]^T & \lambda D - \Xi \end{bmatrix} \geq 0$$

$$\lambda \geq 0$$

where λ is a factor.

The parameters θ in this aspect may include the parameter of the model of the perturbation D and the variance σ:

$$\theta = (\overline{A}, \overline{R}, D, \sigma)$$

The controller 102 is configured to reconstruct the policy π from the gain $$K = Z^T W^{-1}$$

and the parameter $$\Sigma = Y - Z^T W^{-1} Z$$

The controller 102 is configured in this aspect to determine the gradient $$\frac{\delta l}{\delta \theta}$$

for the gradient descent method:

$$\frac{\delta l}{\delta \theta} = \frac{\delta l}{\delta \pi}\frac{\delta \pi}{\delta W}\frac{\delta W}{\delta \theta} = \frac{\delta l}{\delta[K,W]}\frac{\delta[K,W]}{\delta W}\frac{\delta W}{\delta \theta}$$

The reference $u_t^*$ and the reference for the state $x_t^*$ for training the controller 102 may be available from the demonstration data $D=\{u_t^*, x_t^*\}_{t=1}^T$ The reference $u_t^*$ for training the controller 102 may be available from the demonstration data $D=\{u_t^*, y_t^*\}_{t=1}^T$, where $y_t^*$ is the observation at the step t.

The controller 102 is trained by determining the gradient $$\frac{\delta l}{\delta \theta}$$

and determining the gain K and the parameter Σ with the gradient descent method.

The so trained controller 102 is then available to determine the input $u_t$ for the machine 104 at the step t.

In one aspect, the cone programs described above are implemented as a differentiable layer. In an embodiment of the controller 102, the differentiable layer is implemented as a convolutional neural network.

The convolutional neural network is in one aspect trained with the demonstration data $D=\{u_t^*, x_t^*\}_{t=1}^T$. After the training the state x of the machine 104 is mapped to the input u for the machine.

In another aspect, the convolutional neural network is trained with demonstration data $D=\{u_t^*, y_t^*\}_{t=1}^T$. In this aspect, the information y about the state x is used.

Figure 2:
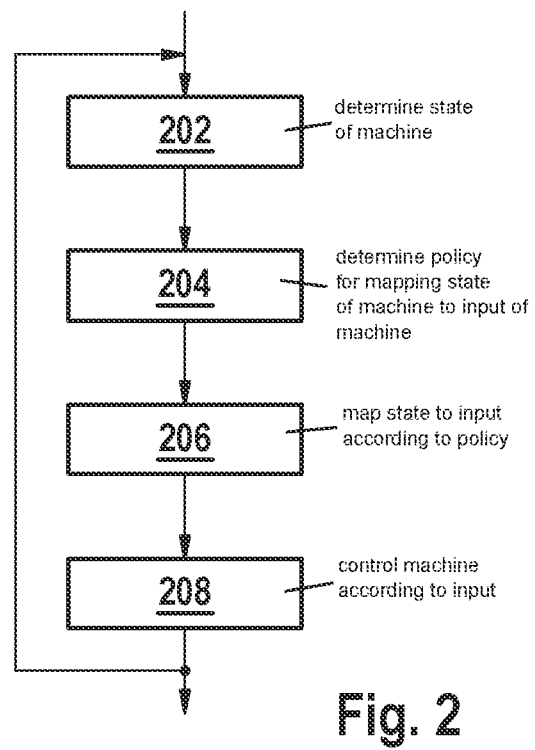
FIG. 2 depicts parts of a control method, in accordance with an example embodiment of the present invention.

A method for controlling the machine 104 is described below with reference to FIG. 2. The method may be executed iteratively in steps t over time series of states $x_t$ and inputs $u_t$ where t=1, . . . T. The states $x_t$ and inputs $u_t$ may be scalar time series. The aim of the method is learning a policy for controlling the machine 104 and then operating the machine 104 accordingly.

The method applies to imitation learning, tracking or reinforcement learning alike.

Imitation learning:

For imitation learning, an expert giving demonstration is available that compromises between worst-case cases and optimal behavior. When an uncertainty or perturbation is present, this uncertainty is taken into account when learning from demonstration in order to improve the imitation performance.

In this case, the policy $$\pi = \arg\min_\pi \sum_{t=0}^\infty \frac{1}{2}(\pi_t^T C_t \pi_t + c_t^T \pi_t)$$

is learned s.t.

$$x_1 = x_{init}$$

$$x_{t+1} = F_t \pi_t + f_t + w_t$$

$$\pi_t \in K$$

where $x_{init}$ is a, in particular random, init state, and

K is a second order cone, $w_t$ is white Gaussian noise, $C_t, c_t, F_t, f_t$ are bounded by an ellipsoidal uncertainty.

The method comprises a step 202.

In the step 202 a state x of the machine 104 is determined.

Determining the state x in one example comprises capturing an input with the sensor, in particular the camera, the radar sensor, the LiDAR sensor, the ultrasonic sensor, or the motion sensor, that monitors the machine 104 or the environment of the machine 104.

Determining the state x in one example comprises recognizing an object in at least a part of a digital image, determining a property of the object, in particular a position, a class or an attribute of the object, and determining the state x depending on the property.

Afterwards, a step 204 is executed.

In step 204 the policy π for mapping the state x of the machine 104 to the input u for the machine 104 is determined.

The controller 102 in this aspect is trained with the gradient descent method based on the demonstration data D to yield $$\min_{u_{1:T}} \|y_t - y_t^*\|_2$$

-continued $$\text{s.t. } x_{t+1} = Ax_t + Bu_t$$

$$y_{t+1} = Hx_{t+1}$$

where H is the observation function.

The observation function H in this example is uncertain. In the example, the ellipsoidal uncertainty is modeled as $$U = \left\{ H = H_0 + \sum_{i=1}^{P} c_i H_i \right\}$$

where U is the uncertainty set and H is an affine function of P parameters $H_i$, and $H_0$ is a nominal observation function, and $\|c\| \leq 1$ is a parameter.

The parameters θ in this aspect may include the parameters $C_t$, $c_t$, $F_t$, $f_t$ and the observation function H:

$$\theta = (A, B, C_t, c_t, F_t, f_t, H)$$

where C=[R,Q].

The controller 102 is trained by determining the gradient $$\frac{\delta l}{\delta \theta}$$

and determining the gain K with the gradient descent method from demonstration data $D=\{u_t^*, y_t^*\}_{t-1}^{T}$ with the loss $$l = \sum_{t=1}^{T} \|u_t - u_t^*\|^2$$

The cost function J(θ, π) that is defined depending on the parameters θ and the policy π is minimized.

Determining the loss l may comprise reading a set $D=\{\pi_i^*\}_{i=1}^{N}$ of references π* for the policy π, selecting a first reference $\pi_i^*$ of the set $D=\{\pi_i^*\}_{i=1}^{N}$, determining a first difference $l_i$ between the policy π and the first reference $\tau_i^*$, determining a sum of the first difference $l_i$ and a second difference that is determined for another policy π and another reference of the set $D=\{\pi_i^*\}_{i=1}^{N}$ of references π* for the policy π, determining the loss l depending on the sum.

The loss l may be normalized by a factor 1/‖D‖ depending on a l2 norm of the distances that are determined for the policies $\pi_i^*$ of the set D.

The gradient $$\frac{\delta l}{\delta \theta}$$

may be determined from the partial derivative $$\frac{\delta l}{\pi}$$

of the loss l with respect to the policy π, the partial derivative $$\frac{\delta \pi}{\delta W}$$

of the policy π with respect to the solution W and the partial derivative $$\frac{\delta W}{\delta \theta}$$

of the solution W with respect to the respective parameters θ.

Determining the solution W and Z to the cone program comprises determining the policy π depending on the solution W that minimizes the cost function J(θ, π) for the parameters θ of the linear quadratic regulator.

The loss l may be determined depending on a difference ‖π−π*‖ between the policy π and the reference π* for the policy π.

The cone program that is defined as described above by the parameters θ of the linear quadratic regulator for the machine 104 is solved subject to the constraint that is defined as described above for the parameters θ and for the solution W of the cone program.

The cost function J(θ, π) that is defined depending on the parameters θ and the policy π is minimized.

Determining the policy π comprises determining the solution W to the cone program for that the cost function J(θ, π) meets a criterion subject to the constraint.

With the gradient descent method at least a subset of the parameters θ are determined depending on these partial derivatives for that the loss l meets a criterion. The method may comprise determining all parameters θ as well. The criterion may be that the loss is minimized. In this aspect, the subset of the parameters θ or the parameters θ that minimize the loss are determined.

The differentiable layer is updated with the parameters θ that define the policy π. In one aspect, the convolutional neural network parameters are updated according to the parameters θ.

The policy parameter K is for example reconstructed from W and Z by determining $K = Z^T W^{-1}$.

Afterwards, a step 206 is executed.

In the step 206 the state x is mapped to the input u for the machine 104 according to the policy π.

The state x is in one aspect mapped by the convolutional neural network.

Afterwards, a step 208 is executed.

In the step 208 the machine 104 is controlled according to the input u for the machine 104. For example, an actuator of the machine 104 is actuated according to the input u for the machine.

After the step 208, the step 202 may be executed.

For example, a movement of the machine 104 in the environment is controlled by repeatedly executing these steps. The movement may be controlled from the position represented by the state x in particular to a target position.

Tracking

For tracking, a robust policy is learned from corresponding demonstration data $D=\{u_t^*, y_t^*\}_{t=1}^{T}$. The method steps 202 to 208 described above are executed for tracking as well. In contrast to the step 204 described above, the robust policy is learned for tracking from the demonstration data $D=\{u_t^*, y_t^*\}_{t=1}^T$, where $y_t^*$ is the observation at the step t.

The controller 102 in this aspect is trained with the gradient descent method based on the demonstration data D to yield $$\min_{u_{1:T}} \|y_t - y_t^*\|_2$$
$$\text{s.t. } x_{t+1} = Ax_t + Bu_t$$
$$y_{t+1} = Hx_{t+1}$$

The gradient $$\frac{\delta l}{\delta \theta}$$

may be determined from the partial derivative $$\frac{\delta l}{\pi}$$

of the loss l with respect to the policy π, the partial derivative $$\frac{\delta \pi}{\delta W}$$

of the policy π with respect to the solution W and the partial derivative $$\frac{\delta W}{\delta \theta}$$

of the solution W with respect to the respective parameters θ as described above.

Reinforcement Learning

For reinforcement learning, a robust policy is learned that is both safe, i.e. optimized for the worse-cases, and able to trade-off between exploration and exploitation. The method steps 202 to 208 described above are executed for reinforcement learning as well. In contrast to the step 204 described above, the policy $u_t=\pi(x_t)=Kx_t+\Sigma^{1/2}e_t$ with the exploration term parameter $e_t \sim N(0,I)$ is learned by determining the gain K and/or the parameter Σ with the corresponding gradient descent method as described above.

The training of the controller 102 depends on the type of policy π. The policy π may comprise the gain K for the LQR controller without exploration parameter Σ.

In this aspect, the method comprises, determining the gain K depending on the solution W and determining the loss l as described above.

The policy π may comprise the gain K and the exploration parameter Σ.

In this aspect, the method comprises, determining the gain K and the exploration parameter Σ depending on the solution W as described above.

In one aspect, the parameters $\theta=(\overline{A}, \overline{B}, Q, R, D, \sigma)$ comprise the parameters $\overline{A}, \overline{B}$ of the state equation for the machine 104, at least one parameter D that models a perturbation attributed to the parameters $\overline{A}, \overline{B}$ of the state equation for the machine 104, at least one parameter a that models a variance of the perturbation, and the parameters Q, R of the cost function J(θ, π)).

The training of the controller 102 depends on the configuration of the training data.

In one aspect, the method may comprise predetermining the parameters $\overline{A}, \overline{B}$ of the state equation, predetermining the at least one parameter a that models the variance, and predetermining the parameters Q, R of the cost function J(θ, π). In this aspect, the method may comprise determining the at least one parameter D that models the perturbation for that the cost function J(∂, π) meets the criterion depending on these predetermined parameters.

The method comprises determining a positive semidefinite matrix M belonging to a positive semidefinite cone in a subspace of symmetric matrices that meets the constraint as described above. This matrix $$M = \begin{bmatrix} I & \sigma I & 0 \\ \sigma I & W - [\overline{A} \ \overline{B}]\Xi[\overline{A} \ \overline{B}]^T & [\overline{A} \ \overline{B}]\Xi^T \\ 0 & \Xi[\overline{A} \ \overline{B}]^T & \lambda D - \Xi \end{bmatrix}$$

comprises elements that are defined depending on the parameters of the state equation for the machine 104. This matrix M comprises elements that are defined depending on the solution W.

In another aspect, the method may comprise predetermining the parameters of the state equation for the machine 104 and determining the solution W for that the matrix M meets the the constraint for the predetermined parameters of the state equation for the machine 104.

In addition to this, the matrix M may comprise elements that are defined depending on the at least one parameter D that models the perturbation.

In addition to this, the matrix M may comprise elements that are defined depending on the at least one parameter G that models the variance.

In this case, the method may comprise predetermining the at least one parameter D that models the perturbation, predetermining the at least one parameter a that models the variance, and determining the solution W for that the matrix M meets the the constraint for the predetermined parameters of the state equation for the machine 104, the predetermined at least one parameter D that models the perturbation, and the predetermined at least one parameter G that models the variance.

At least one element of the matrix M may be determined as described above depending on a factor λ that is larger than Zero or equal to Zero.

In another aspect, the method may comprise predetermining the at least one parameter D that models the perturbation, predetermining the at least one parameter a that models the variance, predetermining the parameters Q, R of the cost function J(θ, π). In this aspect, the method may comprise determining the parameters $\overline{A}, \overline{B}$ of the state equation for that the cost function J(θ, π) meets the criterion depending on these predetermined parameters.

What is claimed is:

1. A computer implemented method of controlling a machine, the method comprising the following steps:
   determining a state of the machine;

determining a policy including parameters, for mapping the state of the machine to an input for the machine, the parameters including a gain;

mapping the state to the input according to the policy;

controlling the machine according to the input;

wherein a cone program is defined by a plurality of parameters of a linear quadratic regulator for the machine, wherein a cost function is defined depending on the plurality of parameters and the policy, wherein a constraint is defined for the parameters and for a solution of the cone program, wherein the determining of the policy includes determining the solution to the cone program so that the cost function meets a criterion subject to the constraint, determining the parameters depending on the solution, determining a normalized loss depending on a difference between the policy and a reference for the policy or depending on a difference between the input and a reference for the input for the machine, determining a partial derivative of the loss with respect to the policy, determining a partial derivative of the policy with respect to the solution, determining a partial derivative of the solution with respect to the plurality of parameters, and determining at least a subset of the plurality of parameters depending on the partial derivatives so that the loss meets a criterion.

2. The method according to claim 1, wherein the determining of at least the subset of the plurality of parameters so that the loss meets the criterion includes determining the at least the subset of the plurality of parameters that minimizes the loss.

3. The method according to claim 1, wherein the plurality of parameters includes parameters of a state equation for the machine, at least one parameter that models a perturbation attributed to the parameters of the state equation for the machine, at least one parameter that models a variance of the perturbation, and parameters of the cost function, wherein the method further comprising:

predetermining the parameters of the state equation, predetermining the at least one parameter that models the variance, predetermining the parameters of the cost function, and determining the at least one parameter that models the perturbation for that the cost function meets the criterion depending on the predetermined parameters.

4. The method according to claim 3, further comprising:

determining a positive semidefinite matrix belonging to a positive semidefinite cone in a subspace of symmetric matrices that meets the constraint, wherein the matrix includes elements that are defined depending on the parameters of the state equation for the machine and/or that are defined depending the solution, and wherein the method further comprises predetermining the parameters of the state equation for the machine and determining the solution for that the matrix meets the constraint for the predetermined parameters of the state equation for the machine.

5. The method according to claim 4, wherein the matrix includes elements that are defined depending on the at least one parameter that models the perturbation and in that the matrix includes elements that are defined depending on the at least one parameter that models the variance, and wherein the method further comprises predetermining the at least one parameter that models the perturbation, predetermining the at least one parameter that models the variance, and determining the solution for that the matrix meets the constraint for the predetermined parameters of the state equation for the machine, the predetermined at least one parameter that models the perturbation, and the predetermined at least one parameter that models the variance.

6. The method according to claim 4, further comprising determining at least one element of the matrix depending on a factor that is larger than Zero or equal to Zero.

7. The method according to claim 1, wherein the plurality of parameters include parameters of a state equation for the machine, at least one parameter that models a perturbation attributed to the parameters of the state equation for the machine, at least one parameter that models a variance of the perturbation, and parameters of the cost function, and wherein the method further comprises:

predetermining the at least one parameter that models the perturbation, predetermining the at least one parameter that models the variance, predetermining the parameters of the cost function, and determining the parameters of the state equation for that the cost function meets the criterion depending on the predetermined parameters.

8. The method according to claim 7, further comprising:

determining a positive semidefinite matrix belonging to a positive semidefinite cone in a subspace of symmetric matrices that meets the constraint, wherein the matrix includes elements that are defined depending on the parameters of the state equation for the machine and/or that are defined depending the solution, and wherein the method further comprises predetermining the parameters of the state equation for the machine and determining the solution for that the matrix meets the constraint for the predetermined parameters of the state equation for the machine.

9. The method according to claim 1, wherein the determining of the solution to the cone program includes determining the policy depending on the solution that minimizes the cost function for the plurality of parameters of the linear quadratic regulator.

10. The method according to claim 1, further comprising:

reading a set of references for the policy;

selecting a first reference of the set;

determining a first difference between the policy and the first reference;

determining a sum of the first difference and a second difference that is determined for another policy and another reference of the set of references for the policy; and determining the loss depending on the sum.

11. The method according to claim 1, wherein the input includes a digital image, wherein determining the state includes:

recognizing an object in at least a part of the digital image, determining a property of the object, the property being a position of the object, or a class of the objection, or an attribute of the object, and determining the state depending on the property.

12. The method according to claim 1, further comprising:

capturing the input with a sensor, the sensor being a camera, or a radar sensor, or a LiDAR sensor, or a ultrasonic sensor, or a motion sensor, that monitors the machine or an environment of the machine.

13. A device for controlling a machine, the device configured to:

determine a state of the machine;

determine a policy including parameters, for mapping the state of the machine to an input for the machine, the parameters including a gain;

map the state to the input according to the policy;
control the machine according to the input;
wherein a cone program is defined by a plurality of parameters of a linear quadratic regulator for the machine,
wherein a cost function is defined depending on the plurality of parameters and the policy,
wherein a constraint is defined for the parameters and for a solution of the cone program,
wherein the determination of the policy includes determining the solution to the cone program so that the cost function meets a criterion subject to the constraint, determining the parameters depending on the solution, determining a normalized loss depending on a difference between the policy and a reference for the policy or depending on a difference between the input and a reference for the input for the machine, determining a partial derivative of the loss with respect to the policy, determining a partial derivative of the policy with respect to the solution, determining a partial derivative of the solution with respect to the plurality of parameters, and determining at least a subset of the plurality of parameters depending on the partial derivatives so that the loss meets a criterion.

14. A non-transitory computer-readable storage medium on which is stored a computer program including computer readable instructions for controlling a machine, the instructions, when executed by a computer, causing the computer to perform the following steps:

determining a state of the machine;
determining a policy including parameters, for mapping the state of the machine to an input for the machine, the parameters including a gain;
mapping the state to the input according to the policy;
controlling the machine according to the input;
wherein a cone program is defined by a plurality of parameters of a linear quadratic regulator for the machine,
wherein a cost function is defined depending on the plurality of parameters and the policy,
wherein a constraint is defined for the parameters and for a solution of the cone program,
wherein the determining of the policy includes determining the solution to the cone program so that the cost function meets a criterion subject to the constraint, determining the parameters depending on the solution, determining a normalized loss depending on a difference between the policy and a reference for the policy or depending on a difference between the input and a reference for the input for the machine, determining a partial derivative of the loss with respect to the policy, determining a partial derivative of the policy with respect to the solution, determining a partial derivative of the solution with respect to the plurality of parameters, and determining at least a subset of the plurality of parameters depending on the partial derivatives so that the loss meets a criterion.

* * * * *